United States Patent [19]

Michalik et al.

[11] 4,301,915

[45] Nov. 24, 1981

[54] SNAP-ON ATTACHMENT FOR ROLLER CHAIN CONVEYORS

[75] Inventors: Anthony J. Michalik, Springfield, Mass.; Peter L. Thiel, Birmingham, Mich.; Ronald D. Elson, Merrill, Mich.; James A. Palmer, Saginaw, Mich.

[73] Assignee: Rexnord Inc., Milwaukee, Wis.

[21] Appl. No.: 111,406

[22] Filed: Jan. 11, 1980

[51] Int. Cl.³ .............................................. B65G 17/06
[52] U.S. Cl. ..................................... 198/851; 403/391
[58] Field of Search .............. 198/648, 831, 841, 848, 198/849, 850, 851, 852, 853; 403/391; 46/23, 26, 31

[56] References Cited

U.S. PATENT DOCUMENTS

| 2,709,318 | 5/1955 | Benjamin | 46/26 |
| 3,450,250 | 6/1969 | Frisk | 198/851 X |
| 3,708,059 | 1/1973 | Ackermann | 198/841 |

FOREIGN PATENT DOCUMENTS 11512  5/1980  European Pat. Off. ............ 198/779

Primary Examiner—Jeffrey V. Nase

[57] ABSTRACT

A roller chain conveyor having wire cross flights and attachments for releasably mounting said cross flights on the chain to provide a conveying surface. The attachment has at least one groove therein to receive an extended portion of the cross flight. The attachments may also be used in conveyors having multiple roller chains therein.

10 Claims, 10 Drawing Figures

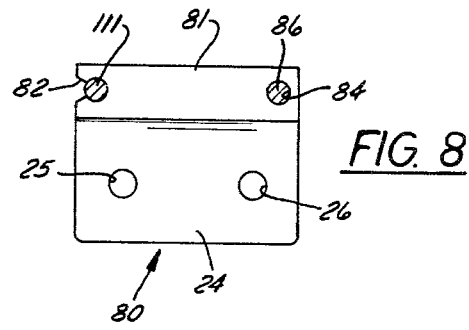
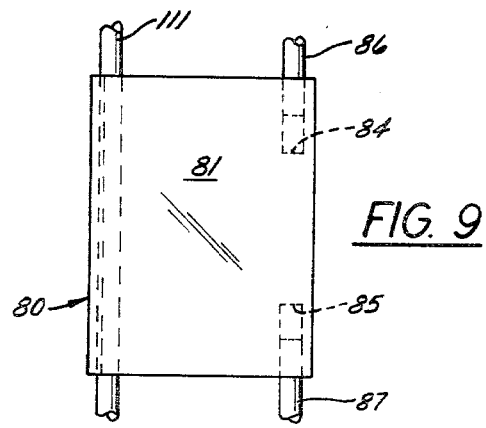
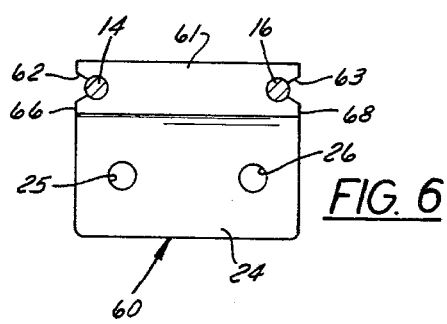
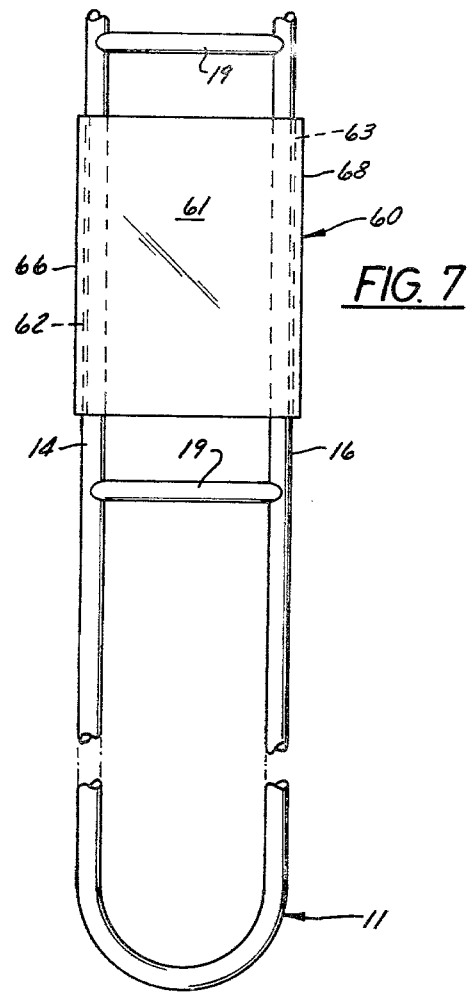

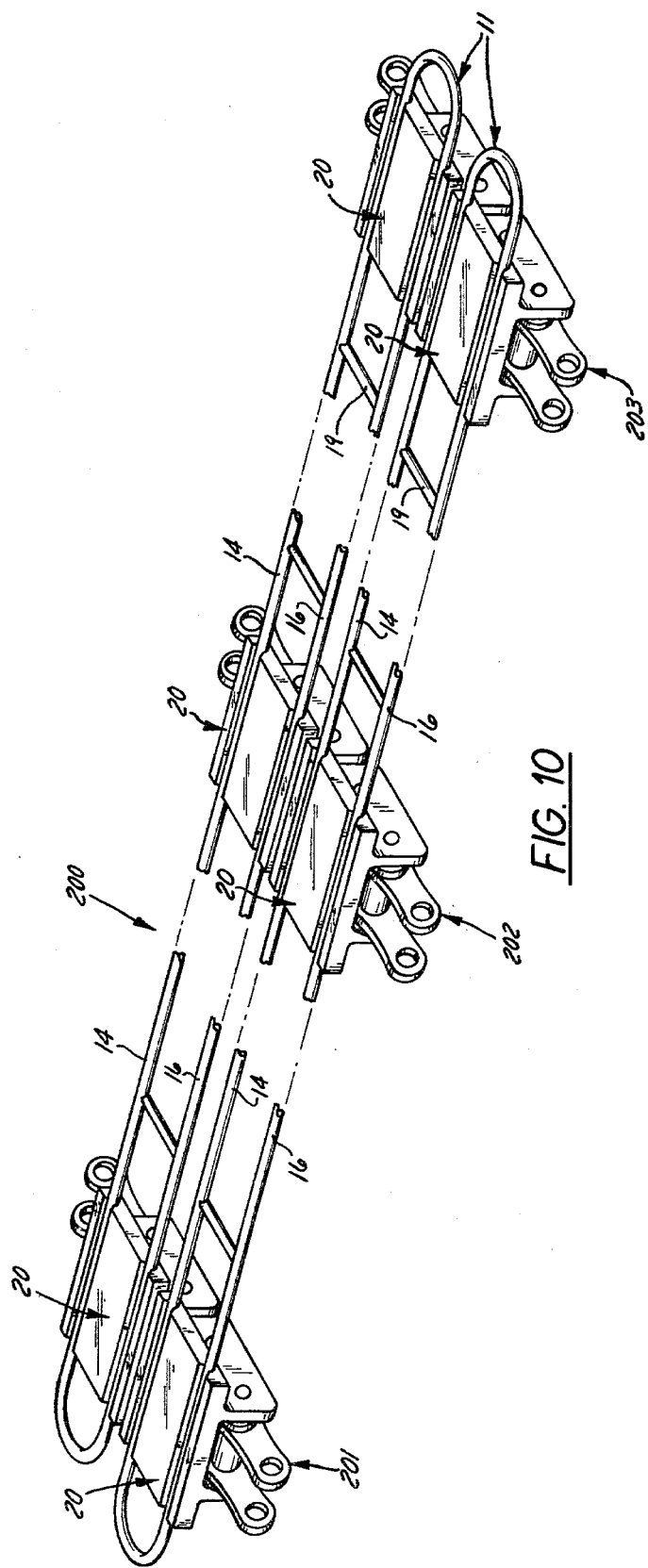

SNAP-ON ATTACHMENT FOR ROLLER CHAIN CONVEYORS

BACKGROUND OF THE INVENTION

The present invention relates to roller chain conveyors of the type having wire or rod cross flights to support transported articles, and more particularly to a conveyor chain attachment to which wire or rod flights can be releasably attached without the use of special tools.

Roller chain conveyors are widely used to transport articles in various industrial applications. In many applications it is desirable to use cross flights made of wire or rod to support the conveyed articles. Cross flights of this type exhibit the advantage of providing support for the articles while contacting only a minimum surface area of the article being conveyed. This is particularly useful in heating, cooling, washing, drying and similar operations where it is desirable to expose a maximum amount of the surface area of the conveyed article.

There exist, in the prior art, numerous roller chain conveyors having wire or rod cross flights. The cross flights are attached to the conveyor chain in several ways, as shown by those disclosed in U.S. Pat. Nos. 3,094,206 issued on June 18, 1963 to Stewart, et al.; 3,252,564 issued on May 24, 1966 to Stewart et al.; 3,363,744, issued on Jan. 16, 1968, to Green, et al.; 3,653,493 issued on Apr. 4, 1972 to Kerr; 3,708,059, issued on Jan. 2, 1973 to Ackermann; 3,910,406 issued on Oct. 7, 1975 to Pulver, et al. and 4,128,165, issued on Dec. 5, 1978 to Euverard.

Those conveyor chains having wire cross flights directly attached to the chain are undesirable because replacement of a particular cross flight requires that a portion of the chain itself be disassembled and/or replaced, often requiring the use of special tools. The difficulty encountered in maintaining and mounting the cross flights results in excessive downtime in a system employing conveyor chain of this type.

Known conveyor chains employing a chain attachment to which the cross flights are, in turn, connected, such as the two-part clip disclosed in U.S. Pat. No. 3,910,406 are undesirable because the cross flights may tend to work themselves loose during operation resulting in the cross flights or entire attachment falling off the chain.

Accordingly, it is one object of the present invention to provide a snap-on attachment for an articulated roller chain which releasably, holds a wire or rod cross flight for conveying articles.

Another object of the present invention is to provide an articulated roller chain conveyor having wire or rod cross flights in which the cross flights are easily mounted on and removed from the chain without the use of special tools.

Other objects and advantages of the present invention will become apparent to those skilled in the art upon reading the entire disclosure with reference to the accompanying drawings.

SUMMARY OF THE INVENTION

The articulated roller chain conveyor of the present invention includes a snap-on attachment comprising a base having at least one groove or slot in the upper portion of the attachment into which a portion of a wire or rod cross flight having extended portions connected at distal ends is mounted in a snap-fit manner. The groove is preferably positioned in the attachment in a direction transverse to the direction of travel of the conveyor chain.

The attachment is mounted on the roller chain using conventional snap-on means such as disclosed in U.S. Pat. No. 2,954,113 issued on Sept. 27, 1960 to Hibbard, et al.

The cross flight assembly disclosed herein may also comprise retention means positioned across and attached to the extended portions of the cross flight to further prevent release of the cross flight from the groove in the attachment. The retention means may also be positioned to prevent lateral movement of the cross flight in the snap-on attachment of the present invention.

The attachment can be modified to accommodate wire cross flights of various configurations. The present invention can also be adapted to provide a conveyor comprising two or more laterally spaced roller chains having a wire flight extending therebetween to provide a conveying surface fixed at its outer edges and having a wider conveying surface than is possible with a single chain having a wire cross flight.

BRIEF DESCRIPTION OF THE DRAWINGS

FIG. 6—is a side view of another conveyor chain attachment of the present invention.

FIG. 7—is a plan view of the conveyor chain attachment of FIG. 6.

FIG. 8—is a side view of another embodiment of the invention.

FIG. 9—is a plan view of the conveyor chain attachment of FIG. 8.

FIG. 10—is a perspective view of a conveyor chain employing multiple roller chains having attachment constructed according to the present invention.

DETAILED DESCRIPTION OF THE PREFERRED EMBODIMENT

Figure 1:
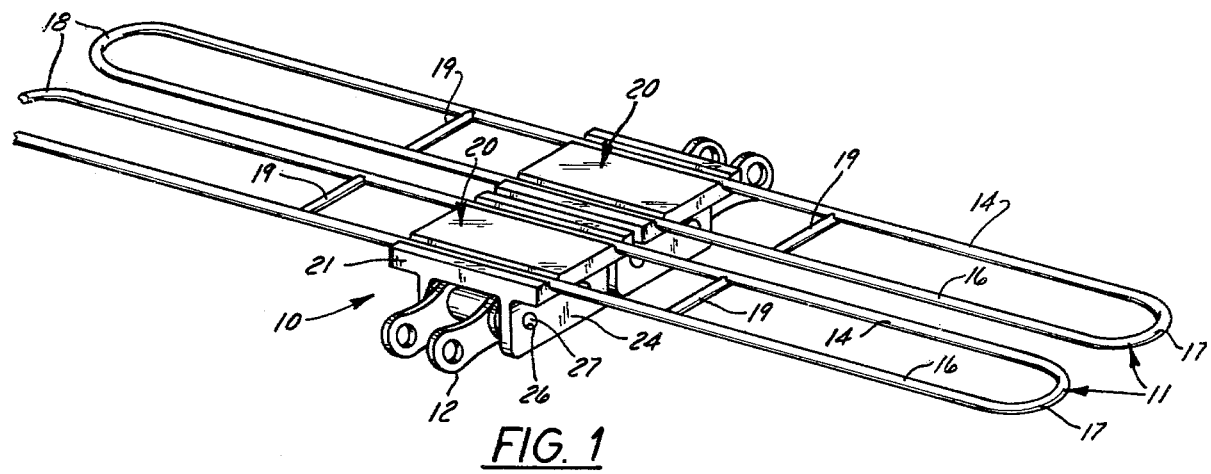
FIG. 1—is a perspective view of a roller chain conveyor with wire cross flights and attachments constructed in accordance with the principles of the present invention.

Referring now to FIG. 1, there is shown an articulated roller chain conveyor 10 having wire or rod cross flights 11 mounted on the attachment 20 in accordance with the principles of the present invention. The roller chain conveyor 10 includes chain links 12 interconnected in a well-known manner.

Figure 2:
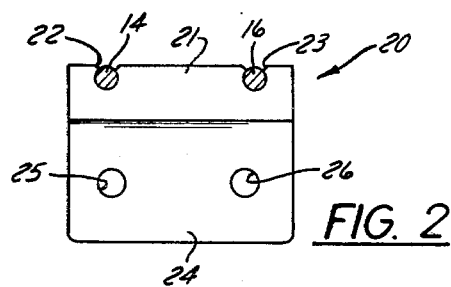
FIG. 2—is a side view of a conveyor chain attachment embodying the present invention.

The attachment 20 shown in FIG. 1 is constructed as shown in FIG. 2 and provided with a means for attaching the base 21 of the attachment to the chain links 12 preferably in a releasable manner so that if the attachment 20 is damaged, it can be easily replaced in a minimum amount of time without disassembling the chain conveyor 10.

The wire cross flight 11 shown in FIG. 1 is constructed in a conventional manner comprising two extended portions 14, 16 connected at their ends by curved portions 17, 18 to provide a conveying surface when it is mounted on the attachment 20 of the present invention. It is preferred, however, that the wire cross flight 11 be modified, as hereinafter disclosed to prevent the cross flight 11 from unintentionally coming loose from the attachment 20 and to restrict lateral movement of the cross flight 11 in the attachment 20. While the cross flight 11 is herein referred to as being wire or rod it is to be understood that it may be constructed of a variety of materials depending upon the intended use for the conveyor 10. For example, in applications in which the surrounding atmosphere is corrosive, it may be advantageous to use a nonmetallic material for the cross flights 11 of the conveyor 10. Likewise, the attachment 20 may be constructed of various materials, providing the material possesses sufficient resiliency to avoid breaking when the cross flight 11 is mounted or detached.

As shown in FIG. 2, one embodiment of the attachment 20 of the present invention includes a base 21 in which there are positioned two grooves 22, 23. Depending from the base 21 are legs 24 having holes 25, 26 into which extend the ends of the connecting pins 27 of the chain 10, when the attachment 20 is pushed over the chain 10. The attachment 20 may be removed by slightly spreading the legs 24 to release them from the connecting pins 27 and then lifting the attachment 20 from the chain 10. Other means of connecting the base 21 to the chain 10 may also be used without departing from the scope of this invention.

The grooves 22, 23 in the base 21 of the attachment 20 of FIG. 2 are positioned in the upper surface of the base 21 and transverse to the direction of conveyor travel. The grooves 22, 23 have a cross section which is greater than semicircular but less than circular so the extended portions 14, 16 of the cross flight 11 can be releasably held in the grooves 22, 23 with a snap fit. If a cross flight 11 becomes damaged in operation, it may be easily replaced by lifting out the old cross flight 11 and snapping in a new one without the use of any tools and with a minimum amount of time and effort.

There are also shown in FIGS. 1 and 2 retention bars 19 connecting the extended portions 14, 16 of the cross flights 11. These bars 19, spaced so they are positioned one on either side of the base 21 of the attachment 20 when the cross flight 11 is mounted thereon, restrict lateral movement of the cross flight 11 in the grooves 22, 23 of the base 21.

Figure 4:
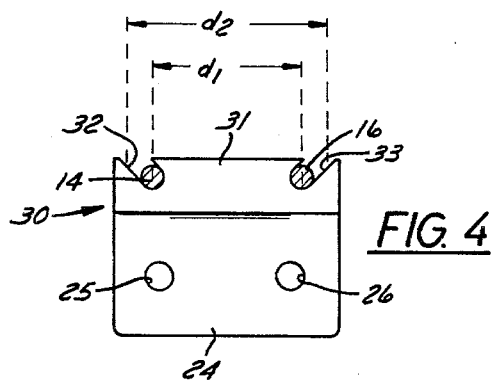
FIG. 4—is a side view of another conveyor chain attachment constructed according to the present invention.
Figure 5:
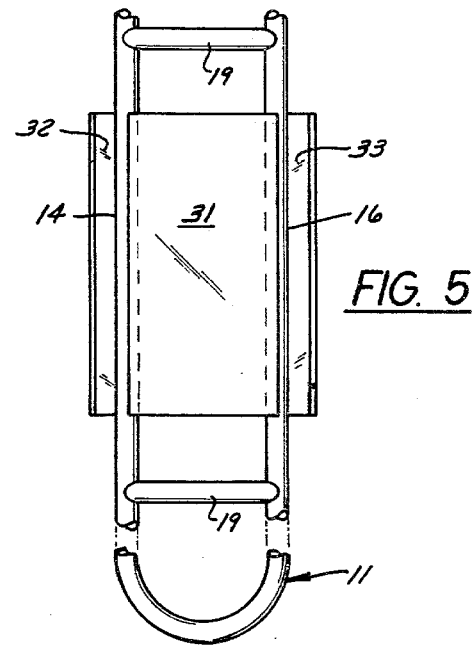
FIG. 5—is a plan view of the conveyor chain attachment of FIG. 4.

Another attachment 30 constructed according to the principles of the present invention is shown in FIGS. 4 and 5. This embodiment is similar to that of FIG. 2 but the grooves 32, 33 are inwardly inclinded from the leading and following edges on the surface of the base 31. Mounting the cross flight 11 on this attachment 30 is accomplished by inserting one of the extended portions 14 of the cross flight 11 into one groove 32 and then stretching the other extended portion 16 of the cross flight 11 to the entrance of the other groove 33 and releasing it into the groove 33. As shown, the normal distance between extended portions 14, 16 of the cross flight 11 is $d_1$. After increasing this distance to $d_2$ by stretching, the extended portions 14, 16 tend to return to their original positions thereby providing the force required to retain the cross flight 11 in the grooves 32, 33. The cross flight 11 is simply stretched and lifted out of the grooves 32, 33 to detach it from the base 31.

As previously described, retention bars 19 may also be provided to prevent lateral movement of the cross flight 11 in the base 31.

As shown in FIGS. 1 through 7, it is readily apparent that openings exist in the upper surface of the base 21, 31 of the attachment 20, 30. In many applications, such as when bakery or other foods are conveyed, it is desirable to avoid openings in which contaminants may settle and which also contact the food. In such applications an attachment 60, as shown in FIGS. 6 and 9 may be used. In these embodiments the grooves 62, 63 are slightly beneath the upper surface of the base 61, to avoid contact of the openings with the conveyed articles.

As shown in FIG. 6, the grooves 62, 63 are similar to those of FIG. 2 except that they are positioned slightly below the upper surface of the base 61 and open toward the leading 66 and following 68 edges of the base 61 with respect to the direction of conveyor travel.

Mounting the cross flight 11 onto the attachment 60 is accomplished by snapping one extended portion 14 into one groove 62, and then stretching the other extended portion 16 over the base 61 and releasing it into the other groove 63. Removal is, of course, accomplished by reversing this procedure. In this embodiment the retention bars 19, if used, also provide an additional means of holding the extended portions 14, 16, of the cross flight 11 in the grooves 62, 63 as well as preventing lateral movement of the cross flight 11 in the grooves 62, 63.

Another embodiment is shown in FIGS. 8 and 9 as having only one groove 82 as previously described and blind holes 84, 85 extending part way into the attachment 80 from each end. This embodiment can accomodate cross flights 111 which are generally C-shaped i.e., one of the extended portions 114 has a separation therein, instead of being a continuous wire or rod as previously described.

Mounting of the cross flight 111 onto the attachment 80 is accomplished by inserting the unconnected ends 86, 87 of the cross flight 111 into the blind holes 84, 85 and then stretching the extended portion 114 of the cross flight 111 over the base 80 and releasing it into the groove 82. As with the previously described embodiments, retention bars may be used to restrict lateral movement of the cross flight 111 and maintain the force required to hold the cross flight 111 in the groove 82.

In some applications, it may be desirable to provide a wider conveying surface than is possible with the use of a single cross flight due to the inability to maintain the stability of a long cross flight with only a single attachment. Also, additional support for the conveying surface may be necessary. This is sometimes accomplished by providing more than one conveyor chain spaced from each other. The attachment of the present invention is also suitable in this instance.

With reference to FIG. 10, there is shown a wire flight conveyor 200 employing attachments 20 constructed in accordance with the present invention. While the attachments 20 in FIG. 10 are shown to be identical to the attachment 20 of FIGS. 2 and 3 it is to be understood that attachments constructed as shown by the other embodiments of this disclosure may also be used either uniformly or in combination with other embodiments to produce the desired results in a particular application.

As can be seen in FIG. 10, the conveyor 200 comprises roller chains 201, 202, 203 laterally spaced apart.

Figure 3:
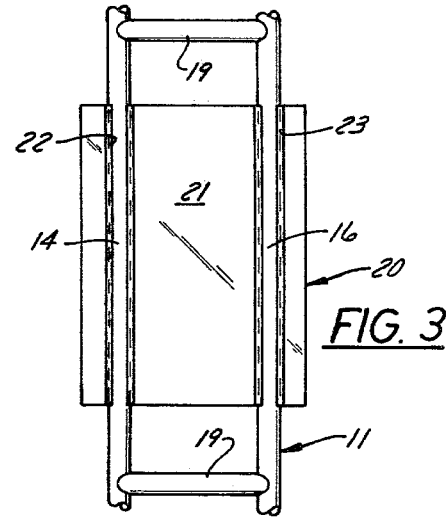
FIG. 3—is a plan view of the conveyor chain of FIG. 2.

Onto each chain are mounted a multiplicity of attachments 20 previously described with reference to FIGS. 2 and 3 having a wire cross flight 11 releasably connected thereto. This cross flight may be similar to those previously discussed. The main difference being that the cross flight 11 in FIG. 10 is substantially longer than the cross flights used in conveyors employing only one roller chain.

Also, retention bars 19 may be positioned between the extended portions 14, 16 of the cross flight 11 where necessary to retain the cross flight in the grooves of the attachments 20 and restrict lateral movement of the cross flight 11.

It should also be apparent that more roller chains could be added to provide either wider conveyors or more support for a conveying surface. Similarly, one roller chain 202 could be deleted in applications for which two chains would be sufficient.

Several embodiments of the present invention have been described, however, it should be apparent to those skilled in the art that variations and modifications can be made therein without departing from the scope of the invention as defined by the following claims.

We claim:

1. A roller chain conveyor comprising: an articulated roller chain including at least some extended connecting pins, a multiplicity of wire cross flights each having a generally C-shaped configuration, and a multiplicity of support attachments for mounting said cross flights onto said roller chain; said attachments each comprising: a base; laterally spaced legs depending from said base; said legs having therein means for receiving the ends of said extended connecting pins for releasably holding said attachment on said roller chain; said base having blind holes therein for releasably receiving the unattached ends of said cross flight and said base having a groove positioned in the leading edge of said base for releasably mounting the extended portion of said cross flight on said base.

2. A roller chain conveyor as defined in claim 1, wherein said cross flight has a generally circular cross section and said groove has a cross section that is greater than semi-circular but less than circular to provide a snap-fit for the extended portion of said cross flight.

3. A roller chain conveyor as defined in claim 1 or 2 further comprising retention means attached between the unattached portions and the extended portion of said cross flight on each side of said support attachment to restrict lateral movement of said cross flight.

4. A roller chain conveyor comprising: an articulated roller chain, a multiplicity of wire cross flights each having a generally C-shaped configuration, and a multiplicity of support attachments for mounting said cross flights onto said roller chain; each of said attachments comprising: a base; means for attaching said base to said roller chain; said base having a groove positioned in one edge of said base for releasably mounting the extended portion of said cross flight; and said base having blind holes therein for releasably receiving the unattached ends of said cross flight.

5. A roller chain conveyor as defined in claim 4 wherein said groove in transverse to the direction of travel of the conveyor and said blind holes are generally parallel to said groove.

6. A roller chain conveyor as defined in claim 5 wherein said groove has a cross-section that is greater than semi-circular but less than circular to provide a snap-fit for the extended portion of said cross flight.

7. A roller chain conveyor as defined in claim 5 or 6 further comprising retention means attached between the unattached portion and the extended portion of said cross flight on each side of said support attachment to restrict lateral movement of said cross flight.

8. A support attachment comprising: a generally flat, rectangular base defining an upper surface having first and second parallel edges; said first edge having a longitudinal groove therein; said second edge having a pair of opposed blind holes therein; said blind holes being parallel to said groove, and means depending from said base for releasable connection of said attachment to a conveyor chain.

9. A support attachment as defined in claim 8 wherein said connection means comprises a pair of laterally spaced legs depending from said base and positioned transverse to said groove.

10. A support attachment as defined in claim 8 or 9 wherein the cross-section of said groove defines a circumference that is greater than semi-circular but less than circular.

* * * * *